May 14, 1929.　　　R. H. STALEY　　　1,713,404
SCRAPER PAN
Filed July 16, 1926　　　5 Sheets-Sheet 2
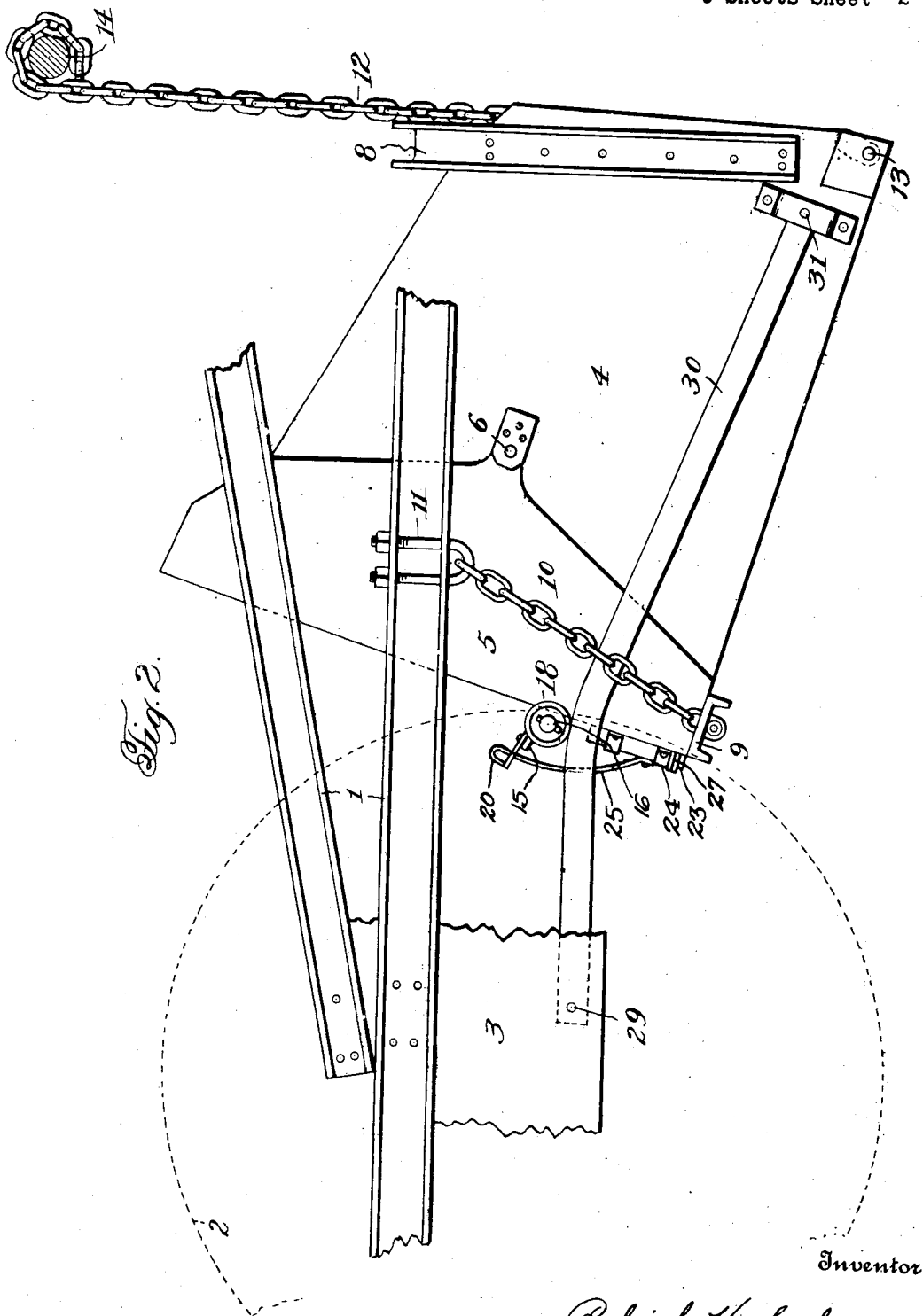
Witness:
Jas E. Hutchinson
Inventor:
Raleigh H. Staley,
By
Milans & Milans
Attorneys

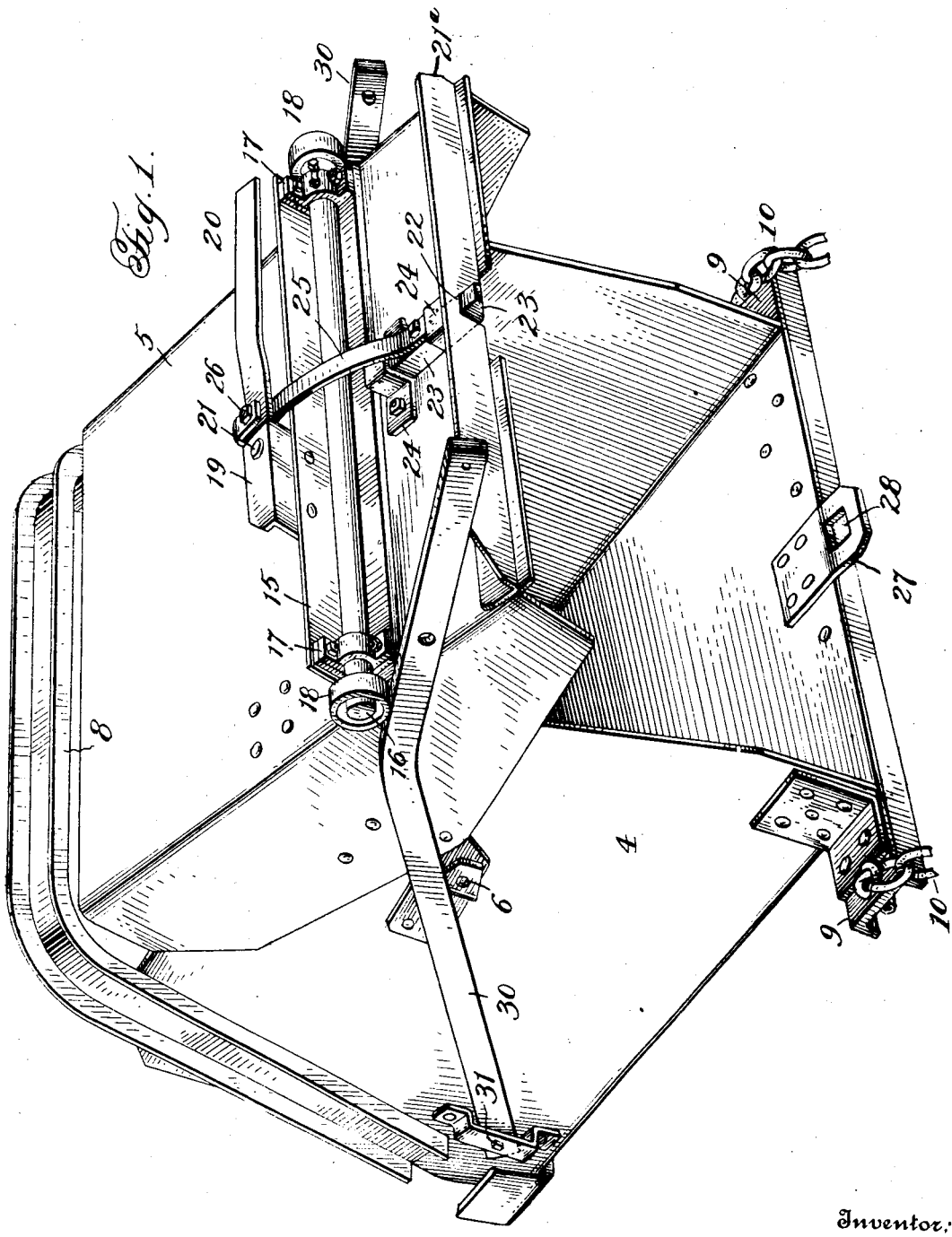

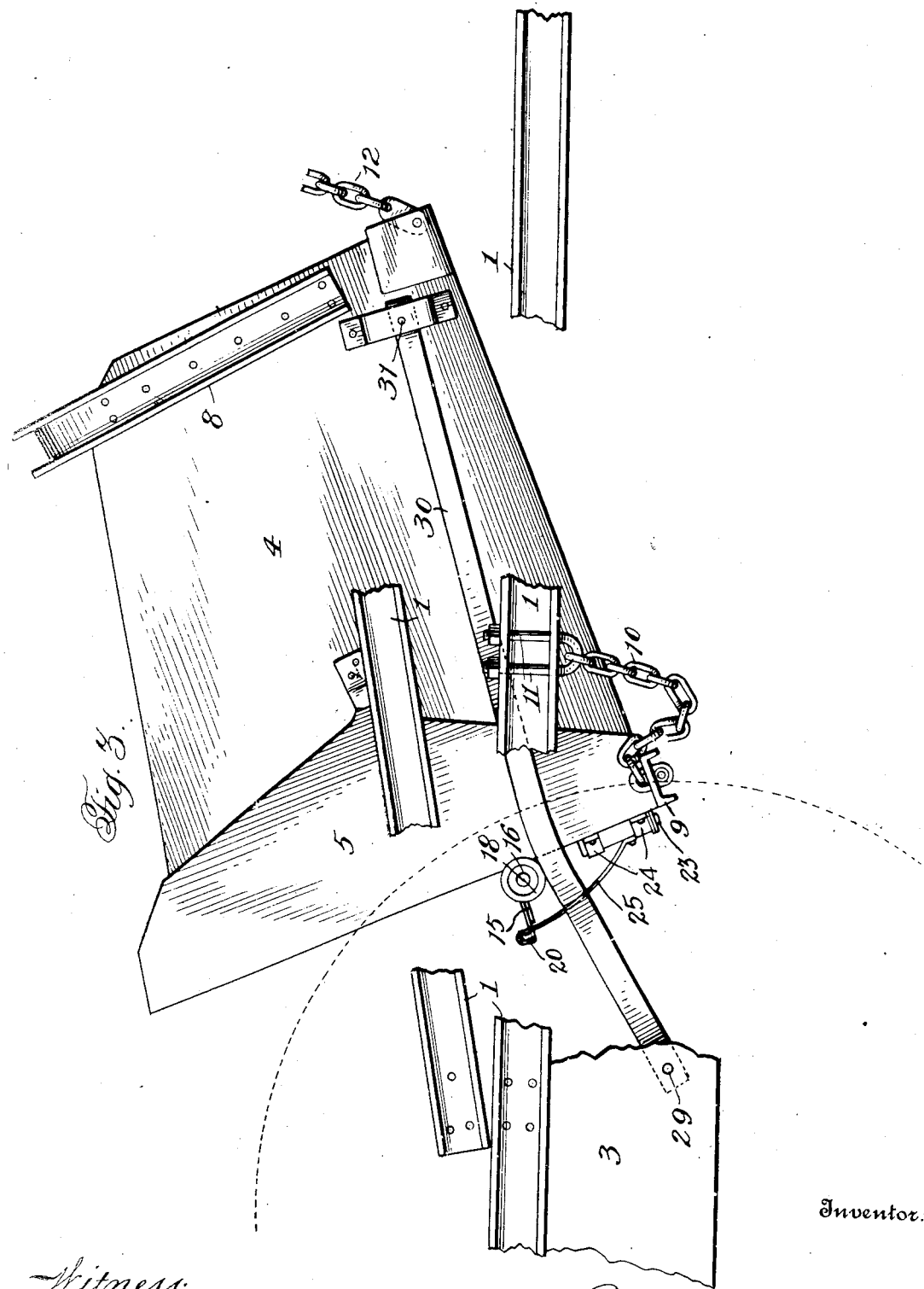

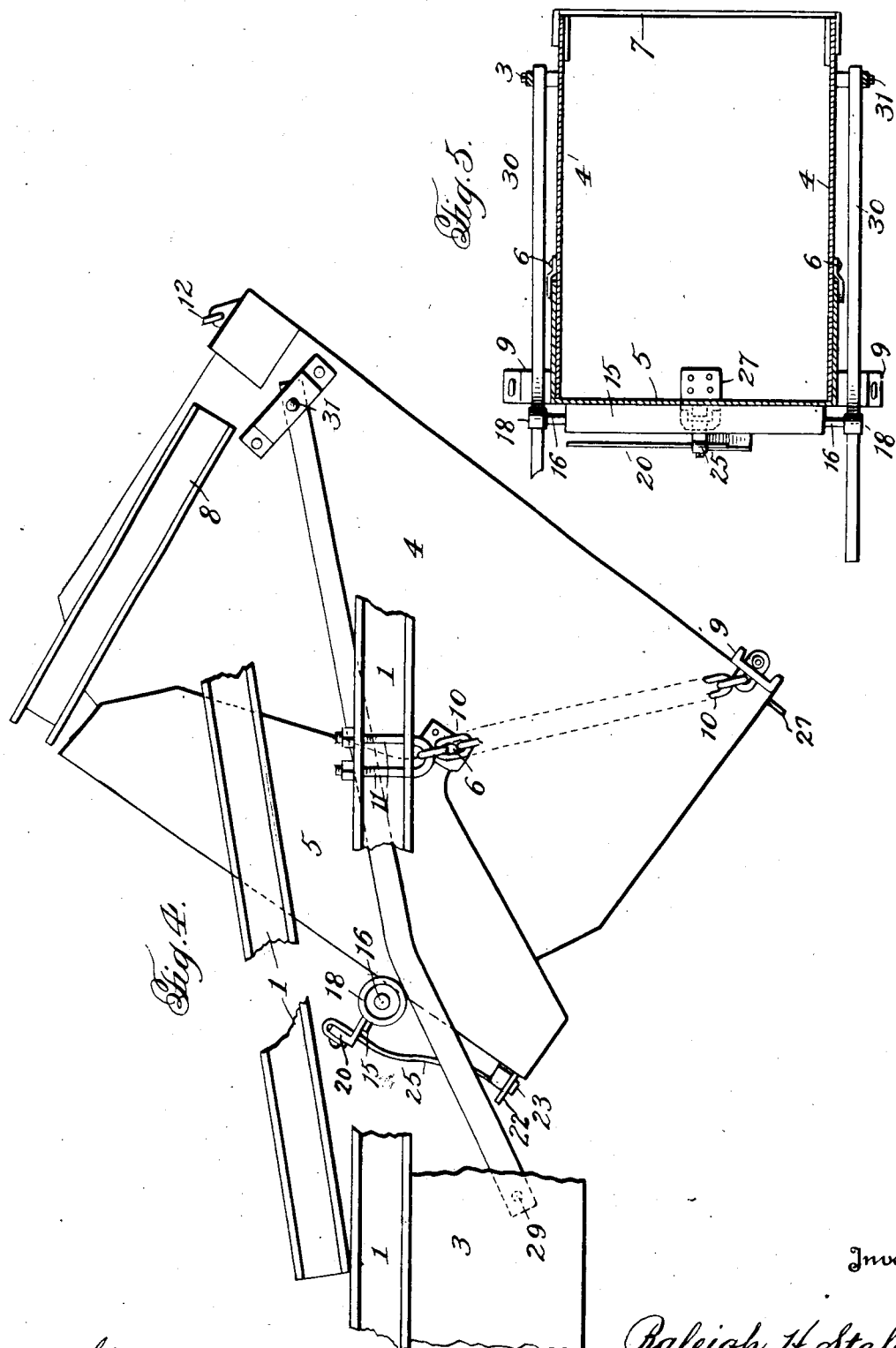

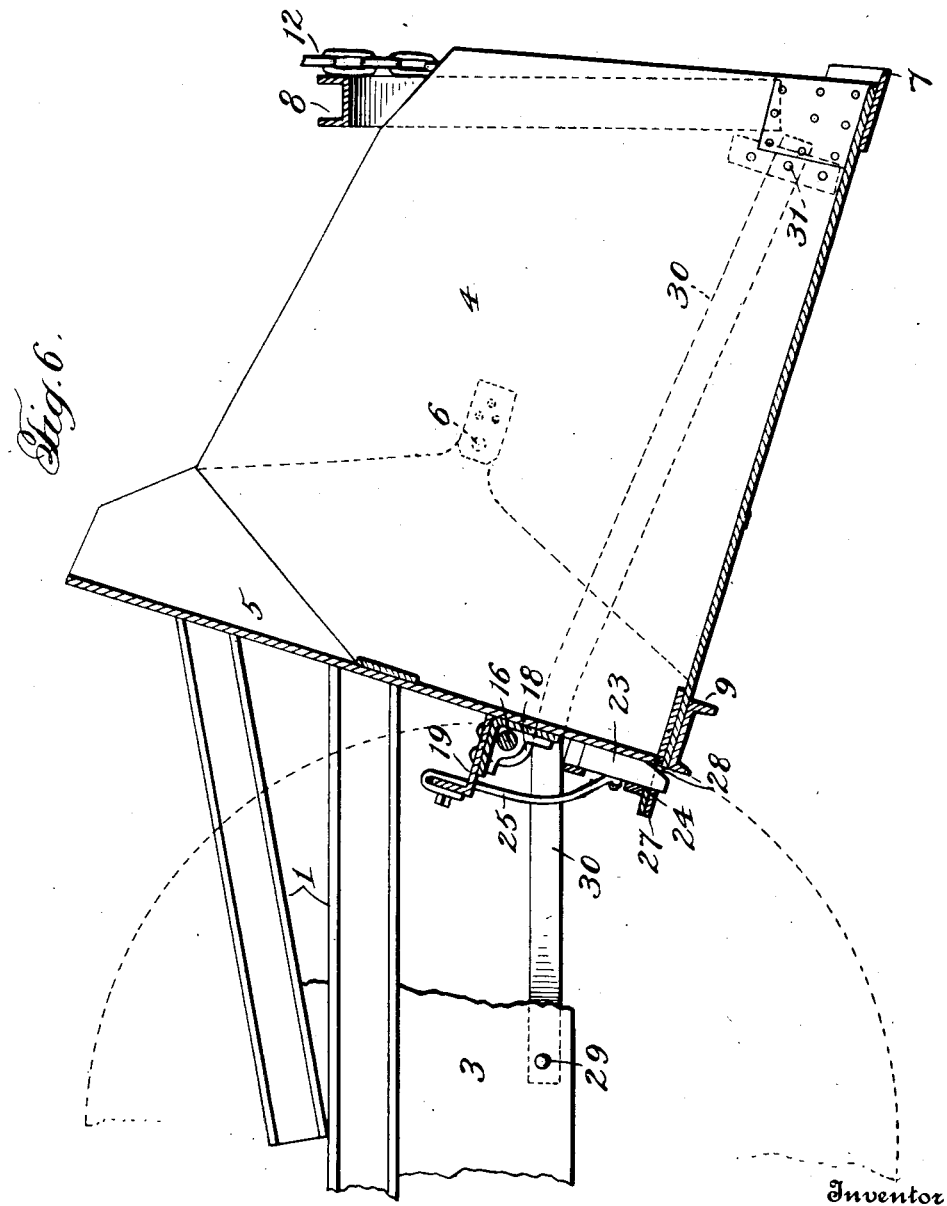

Patented May 14, 1929.

1,713,404

UNITED STATES PATENT OFFICE.

RALEIGH H. STALEY, OF SPRINGFIELD, ILLINOIS, ASSIGNOR TO THE BAKER MANUFACTURING COMPANY, OF SPRINGFIELD, ILLINOIS, A CORPORATION OF ILLINOIS.

SCRAPER PAN.

Application filed July 16, 1926. Serial No. 122,874.

My invention relates to new and useful improvements in scraper pans adapted for use more particularly with wheeled scrapers for gathering earth and conveying it from one place to another, the primary object of the invention residing in the provision of a scraper pan which is suspended from the scraper in a novel manner to be positioned for scraping the earth into the pan, raised into position for carrying the earth from place to place, and operated to discharge or dump the dirt when the desired place has been reached.

Another object of the invention resides in the provision of a scraper pan having a novel form of gate or door and novel means for holding the same in closed position and for releasing the same when the earth is to be dumped from the pan.

A further object of the invention consists in providing the door or gate of the pan with rollers or similar members which are adapted to be engaged by operating levers, the operating levers engaging the rollers or similar members raising and holding the entire pan so that the earth may be conveyed from place to place and when the dirt or earth is to be discharged will hold the door or gate while allowing the pan to swing into dumping position.

With the above and other objects in view, which will appear as the description proceeds, my invention consists in the novel details of construction, and arrangement of parts described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 1 is a perspective of the pan, detached from the machine, with the door or gate in dumping position.

Fig. 2 is a side elevation showing the pan in its scraping position.

Fig. 3 is a side elevation showing the pan in its carrying position.

Fig. 4 is a side elevation showing the pan in its dumping position.

Fig. 5 is a horizontal section through the pan with parts shown in top plan, and Fig. 6 is a longitudinal vertical section through the pan with parts shown in scraping position.

In the drawings 1 indicates the frame portion of the scraping machine and 2 one of the rear supporting wheels. Secured to the frame 1, at each side of the machine, is a depending plate 3 for a purpose which will be readily apparent. As the particular construction of the machine forms no part of the present invention a further detail description or illustration thereof is not thought necessary.

My improved form of pan body is shown at 4 and has the door or gate 5 pivotally connected thereto at 6, the door or gate being adapted for closing the rear end of the pan body, it being understood that said body is approximately of U-shape. Secured to the forward end of the body is the scraper blade 7, said blade adapted to cut the earth so that it may be received in the pan. Secured, adjacent the forward end of the pan body is the bail 8 which overlies the top of the pan as quite clearly illustrated in the drawings. Secured to the bottom of the pan body, adjacent the rear end thereof, is the angle bar 9 to the ends of which are connected the lower ends of the supporting chains 10. The upper ends of the supporting chains 10 are secured to the frame 1 by means of the U-bolts 11. The forward end of the pan body is supported by the chains 12 the lower ends of which are connected to the pins 13 secured to the sides of the pan body. The chains are adapted to be wound upon the drum 14 supported on the machine in any desired manner and operated with the hand or through suitable mechanism operated from the machine.

Secured to the outer face of the door or gate 5 is the angle plate 15 which supports the horizontal shaft 16 in the bearings 17. Secured to each end of the shaft 16 is a roller 18 for a purpose which will be presently described. Secured to the plate 15 is the bracket 19 to which the lever 20 is pivotally connected at 21. Secured adjacent the lower edge of the door or gate 5 is the angle plate 21ᵃ having an opening 22 therein through which the latch bolt 23 may pass as more particularly illustrated in Fig. 1 of the drawings. The latch bolt 23 is slidably mounted in the guides 24 and connected to the latch bolt is one end of the link 25, the opposite end of the link being connected to the lever 20 at 26. Secured to the bottom of the pan body, at the rear edge thereof, is the latch plate 27 having the opening 28 to receive the lower end of the latch bolt 23 as more particularly illustrated in Fig. 6 of the drawings.

Pivotally connected at 29 to each of the depending plates 3, on opposite sides of the machine, is a bar 30, the forward ends of the bars being pivotally connected at 31 to the side of the pan body. The bars are of the angular shape shown and are adapted for engaging the rollers 18 carried by the horizontal shaft 16.

In view of the detailed description it is thought that the construction will be clearly understood and I will now endeavor to more clearly bring out the operation. In Fig. 2 of the drawings the pan is shown in its scraping position. The plate 7 cuts through the earth and the same is directed into the pan body, the discharge from the rear end thereof being prevented by the door or gate 5. When in its scraping or cutting position the door of the pan is held in closed position by means of the latch bolt 23 engaging in the opening 28 of the latch plate 27. When the pan has become full it is raised into the carrying position shown in Fig. 3 by winding the supporting chains 12 upon the drum 14. The winding of the chain 12 upon the drum 14 raises the forward end of the pan and as the forward end of the pan is raised the bars 30, engage the rollers 18 and thereby raise the rear end of the pan slackening the supporting chains 10 as quite clearly shown in Fig. 3. With parts as shown in Fig. 3 the machine may be moved to the desired place for dumping and when it is desired to dump the lever 20 is operated to draw upwardly on the latch bolt 23 through means of the link 25. When the end of the latch bolt is disengaged from the opening 28 in the latch plate 27 the rear end of the pan body will drop into the position shown in Fig. 4, the forward end of the pan being supported by the chains 12 and the door or gate assuming the position shown in Fig. 4 and held in open position by engagement of the rollers 18 with the bars 30. After dumping the machine may be moved to the desired position for again scraping and when such place is reached the chains 12 will be unwound from the drum 14 thereby allowing the parts to assume the scraping position shown quite clearly in Fig. 2.

It will be noted that when in dumping position the parts are so held as to provide a large opening through which the dirt or earth may be discharged.

Having fully described my invention what I claim as new and desire to secure by Letters Patent is:

1. In combination with a support, a scraping pan, a door connected to the scraping pan for swinging movement, bars pivotally connected to the support and pan, members carried by the door and adapted to be engaged by and operate upon the bars, means for raising the forward end of the pan, the rear end thereof being raised by engagement of the bars with the members, and means independent of the bars and members for normally holding the door in closed position over one end of the pan but adapted to be operated to release the door to allow the pan to drop into dumping position, the movement of the pan swinging the door with the members remaining in engagement with the bars.

2. In combination with a support, a scraping pan, a door connected to the scraping pan for swinging movement, bars pivotally connected to the support and pan, members carried by the door and adapted to be engaged by and operate upon the bars, means for raising the forward end of the pan, the rear end thereof being raised by engagement of the bars with the members, a latch carried by the door and engageable with the pan for normally holding the door in closed position, and means independent of the bars and members for releasing the latch to allow the pan to drop into dumping position, the movement of the pan swinging the door with its members remaining in engagement with the bars.

3. In combination with a support, a scraping pan, a door connected to the scraping pan for swinging movement, bars pivotally connected to the support and pan, members carried by the door and adapted to be engaged by and operate upon the bars, means for raising the forward end of the pan, the rear end thereof being raised by engagement of the bars with the members, an angle iron plate carried by the door, a latch carried by the door and operable through the angle iron plate for engaging the pan for normally holding the door in closed position, and means independent of the bars and members for releasing the latch to allow the pan to drop into dumping position, the movement of the pan swinging the door with its members remaining in engagement with the bars.

In testimony whereof I hereunto affix my signature.

RALEIGH H. STALEY.